(12) United States Patent
Chien et al.

(10) Patent No.: US 11,545,870 B2
(45) Date of Patent: Jan. 3, 2023

(54) MOTOR

(71) Applicant: Delta Electronics, Inc., Taoyuan (TW)

(72) Inventors: Han-En Chien, Taoyuan (TW);
Tse-Peng Huang, Taoyuan (TW);
Hung-Chi Chen, Taoyuan (TW);
Meng-Yu Chen, Taoyuan (TW)

(73) Assignee: DELTA ELECTRONICS, INC.,
Taoyuan (TW)

( * ) Notice: Subject to any disclaimer, the term of this patent is extended or adjusted under 35 U.S.C. 154(b) by 72 days.

(21) Appl. No.: 17/324,961

(22) Filed: May 19, 2021

(65) Prior Publication Data
US 2021/0320551 A1 Oct. 14, 2021

Related U.S. Application Data

(63) Continuation-in-part of application No. 16/997,906, filed on Aug. 19, 2020, now Pat. No. 11,456,648.

(30) Foreign Application Priority Data

Apr. 10, 2020 (CN) .......................... 202010276543.1

(51) Int. Cl.
| | |
|---|---|
| *H02K 7/00* | (2006.01) |
| *H02K 5/173* | (2006.01) |
| *H02K 15/02* | (2006.01) |
| *H02K 7/08* | (2006.01) |

(52) U.S. Cl.
CPC ........... *H02K 5/1732* (2013.01); *H02K 7/003* (2013.01); *H02K 7/083* (2013.01); *H02K 15/02* (2013.01)

(58) Field of Classification Search
CPC ...... H02K 5/1732; H02K 7/003; H02K 7/083; H02K 15/02
USPC ............................................................ 310/66
See application file for complete search history.

(56) References Cited

U.S. PATENT DOCUMENTS

| | | | |
|---|---|---|---|
| 8,816,542 | B2 | 8/2014 | Kim |
| 10,608,511 | B2 | 3/2020 | Jung |
| 2012/0286608 | A1 | 11/2012 | Komiyama et al. |
| 2015/0252507 | A1 | 9/2015 | Kim et al. |
| 2016/0315524 | A1 | 10/2016 | Ozaki |
| 2018/0301961 | A1 | 10/2018 | Fukunaga et al. |
| 2021/0367486 | A1 | 11/2021 | Shim et al. |

FOREIGN PATENT DOCUMENTS

| | | |
|---|---|---|
| CN | 108370192 B | 1/2020 |
| EP | 2685611 B1 | 1/2014 |
| EP | 3157141 A1 | 4/2017 |
| KR | 100691916 B1 | 3/2007 |
| TW | I690135 B | 4/2020 |

*Primary Examiner* — Terrance L Kenerly
(74) *Attorney, Agent, or Firm* — Kirton McConkie; Evan R. Witt

(57) ABSTRACT

The present disclosure provides a motor with a grounded rotor. The motor includes a stator and a rotor. The stator includes a bearing seat, a conductive plate and an elastic element. The bearing seat receives a first bearing and a second bearing. The conductive plate is disposed in the bearing seat and has at least one overlapping foot convexly formed thereon. The elastic element is arranged between the first bearing and the second bearing, and integrally formed with the at least one overlapping foot into one piece. The rotor includes a rotating shaft. The rotating shaft is inserted in the first bearing and the second bearing along the axial direction. The conductive plate and the rotating shaft are electrically connected to each other.

20 Claims, 15 Drawing Sheets

MOTOR

CROSS-REFERENCE TO RELATED APPLICATION

This application is a continuation-in-part application of U.S. application Ser. No. 16/997,906 filed on Aug. 19, 2020, and entitled "ROTOR-GROUNDED MOTOR", which claims priority to China Patent Application No. 202010276543.1, filed on Apr. 10, 2020. The entire contents of the above-mentioned patent applications are incorporated herein by reference for all purposes.

FIELD OF THE INVENTION

The present disclosure relates to a motor, and more particularly to a motor having a rotor grounded.

BACKGROUND OF THE INVENTION

The rotating shafts of current motors and generators often generate voltages, i.e. the shaft voltage, due to inductive coupling or capacitive coupling with motor winding. A leakage current to the rotating shaft is easily generated on a DC motor because of armature winding, and the leakage current generated by the shaft voltage is easy to damage the motor bearings. Therefore, a common improvement method is to ground the rotating shaft to reduce the shaft voltage.

In the field of design of motor grounding of inner rotor motors currently, a bearing is connected to ground through an outer stator for reducing the shaft voltage. As the rotor is a moving part, which is not easy to wire and conduct, existing rotor grounding structures generally require additional parts to achieve grounding. Thus, there are few designs to ground the rotor. However, the stator of the outer rotor motor is located at an inner side so that it is not easy to wire. Therefore, how to ground the outer rotor motor is a problem to be solved in the technical field of the present invention.

Therefore, there is a need of providing a motor having a rotor grounded to overcome the above drawbacks.

SUMMARY OF THE INVENTION

An object of the present disclosure is to provide a motor having a rotor grounded. By connecting the bearing through a conductive plate, the purpose of grounding the rotor is achieved, so as to improve the full frequency electromagnetic interference characteristics of the motor. The conductive plate and the silicon steel sheet are coated by an insulation shell through an injection molding process, and the conductive plate is partially exposed to the bearing seat and directly connected to the bearing to achieve the purpose of grounding the rotor. The entire structure is simplified, and the bearing seat and the conductive plate are integrally formed. Extra components are omitted. It is beneficial of reducing the complexity of manufacturing and the man-hours, effectively simplifying the assembly process, and reducing the cost.

Another object of the present disclosure is to provide a motor having a rotor grounded. When the first bearing and the second bearing of the motor are disposed in the bearing seat and arranged along the axial direction, an elastic element is disposed between the first bearing and the second bearing to ensure the accuracy of position fixing in the axial direction. Since the elastic element is arranged between the first bearing and the second bearing, the elastic element can be selectively abutted by the first bearing or the second bearing.

Other object of the present disclosure is to provide a motor having a rotor grounded. With the conductive plate and the elastic element integrally formed into one piece, when the first bearing constantly abuts the elastic element, the purpose of grounding the rotor is achieved, and it ensures the accuracy of position fixing in the axial direction at the same time. The conductive plate and the elastic element integrally formed are coated with the silicon steel sheet by an insulation shell for example through an injection molding, so that the conductive plate, the elastic element, the silicon steel sheet, the insulation shell and an bearing seat are aligned and positioned with the bearing seat. Thus, the manufacturing process is simplified and the production cost is reduced.

In accordance with an aspect of the present disclosure, a motor having a rotor grounded is provided. The motor includes a stator and a rotor. The stator includes a bearing seat, a conductive plate and an elastic element. The bearing seat receives a first bearing and a second bearing. The conductive plate is disposed in the bearing seat and includes at least one overlapping foot convexly formed thereon. The elastic element is disposed between the first bearing and the second bearing. The elastic element is electrically connected to the conductive plate and the first bearing. The rotor includes a rotating shaft inserted in the first bearing and the second bearing along an axial direction. The conductive plate and the rotating shaft are electrically connected to each other.

In accordance with another aspect of the present disclosure, a motor having a rotor grounded is provided. The motor includes a stator and a rotor. The stator includes a first bearing, a conductive plate and a bearing seat. The conductive plate includes an elastic element, wherein the first bearing is electrically connected to the conductive plate through the elastic element. The bearing seat receives the first bearing and the conductive plate. The rotor includes a rotating shaft. The rotating shaft is passed through the first bearing along an axial direction. The rotating shaft is elastically connected to the conductive plate.

In accordance with a further aspect of the present disclosure, a motor having a rotor grounded is provided. The motor includes a stator and a rotor. The stator includes a first bearing, a conductive plate and a bearing seat. The conductive plate includes an elastic element. The first bearing is electrically connected to the conductive plate through the elastic element. The conductive plate is clamped by the first bearing and the bearing seat. The rotor includes a rotating shaft. The rotating shaft is passed through the first bearing along an axial direction. The rotating shaft is elastically connected to the conductive plate.

The above contents of the present disclosure will become more readily apparent to those ordinarily skilled in the art after reviewing the following detailed description and accompanying drawings, in which:

DETAILED DESCRIPTION OF THE PREFERRED EMBODIMENT

Figure 1:
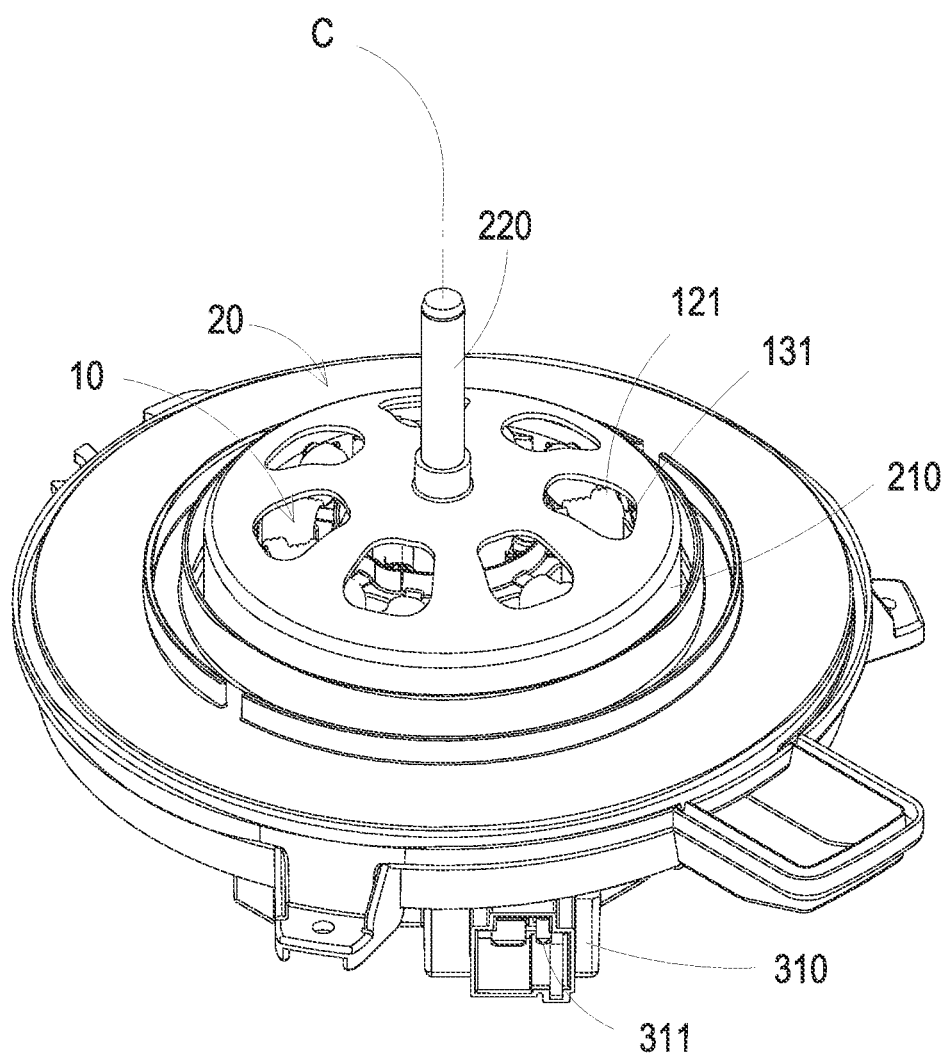
FIG. 1 is a perspective structural view illustrating a motor according to a first embodiment of the present disclosure.

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed. Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly. When an element is referred to as being "connected," or "coupled," to another element, it can be directly connected or coupled to the other element or intervening elements may be present. Although the wide numerical ranges and parameters of the present disclosure are approximations, numerical values are set forth in the specific examples as precisely as possible. In addition, although the "first," "second," "third," and the like terms in the claims be used to describe the various elements can be appreciated, these elements should not be limited by these terms, and these elements are described in the respective embodiments are used to express the different reference numerals, these terms are only used to distinguish one element from another element. For example, a first element could be termed a second element, and, similarly, a second element could be termed a first element, without departing from the scope of example embodiments. Besides, "and/or" and the like may be used herein for including any or all combinations of one or more of the associated listed items. Alternatively, the word "about" means within an acceptable standard error of ordinary skill in the art-recognized average. In addition to the operation/working examples, or unless otherwise specifically stated otherwise, in all cases, all of the numerical ranges, amounts, values and percentages, such as the number for the herein disclosed materials, time duration, temperature, operating conditions, the ratio of the amount, and the like, should be understood as the word "about" decorator. Accordingly, unless otherwise indicated, the numerical parameters of the present invention and scope of the appended patent proposed is to follow changes in the desired approximations. At least, the number of significant digits for each numerical parameter should at least be reported and explained by conventional rounding technique is applied. Herein, it can be expressed as a range between from one endpoint to the other or both endpoints. Unless otherwise specified, all ranges disclosed herein are inclusive.

Figure 2:
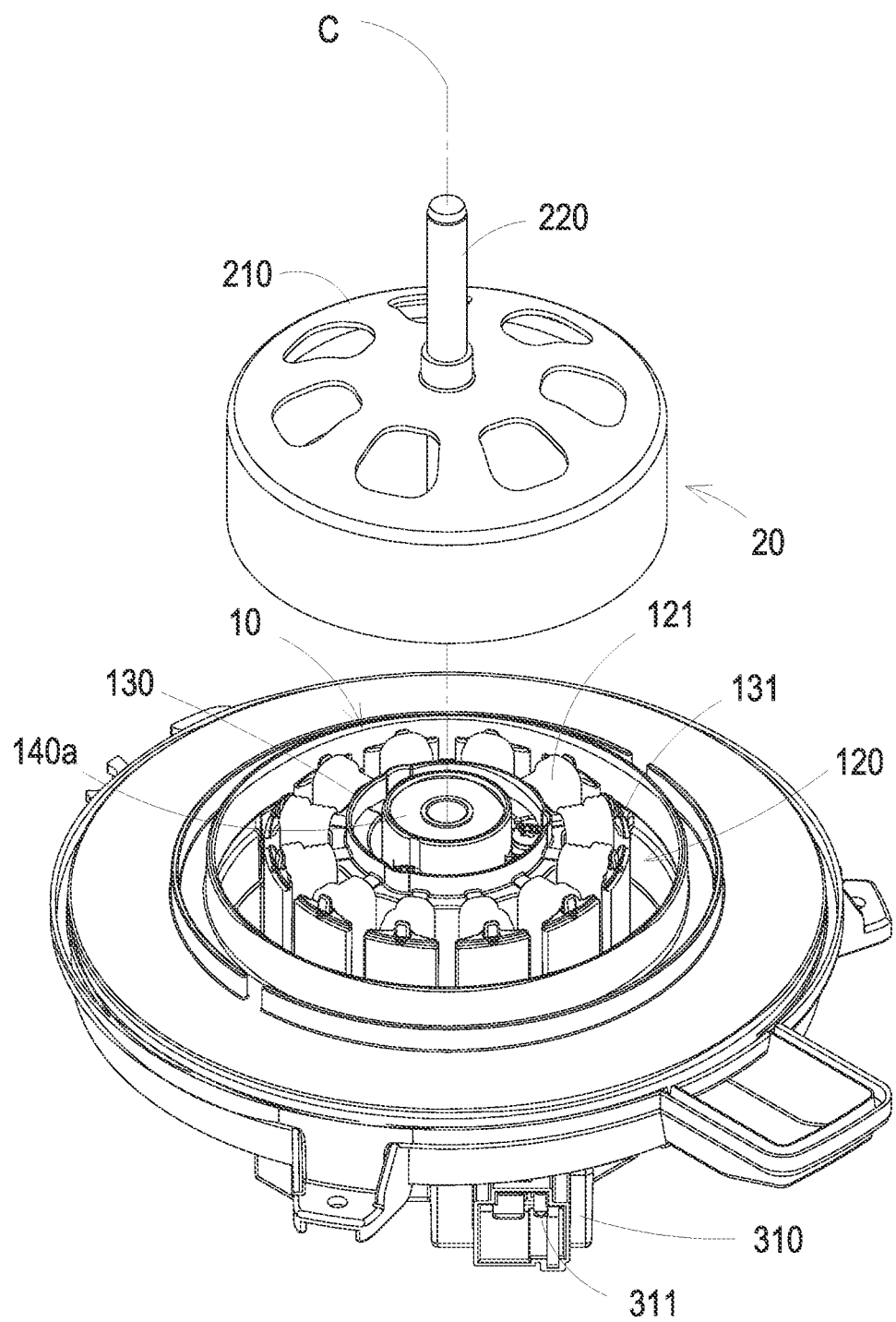
FIG. 2 a perspective structural view illustrating the motor having the stator and the rotor disassembled according to the first embodiment of the present disclosure.
Figure 3:
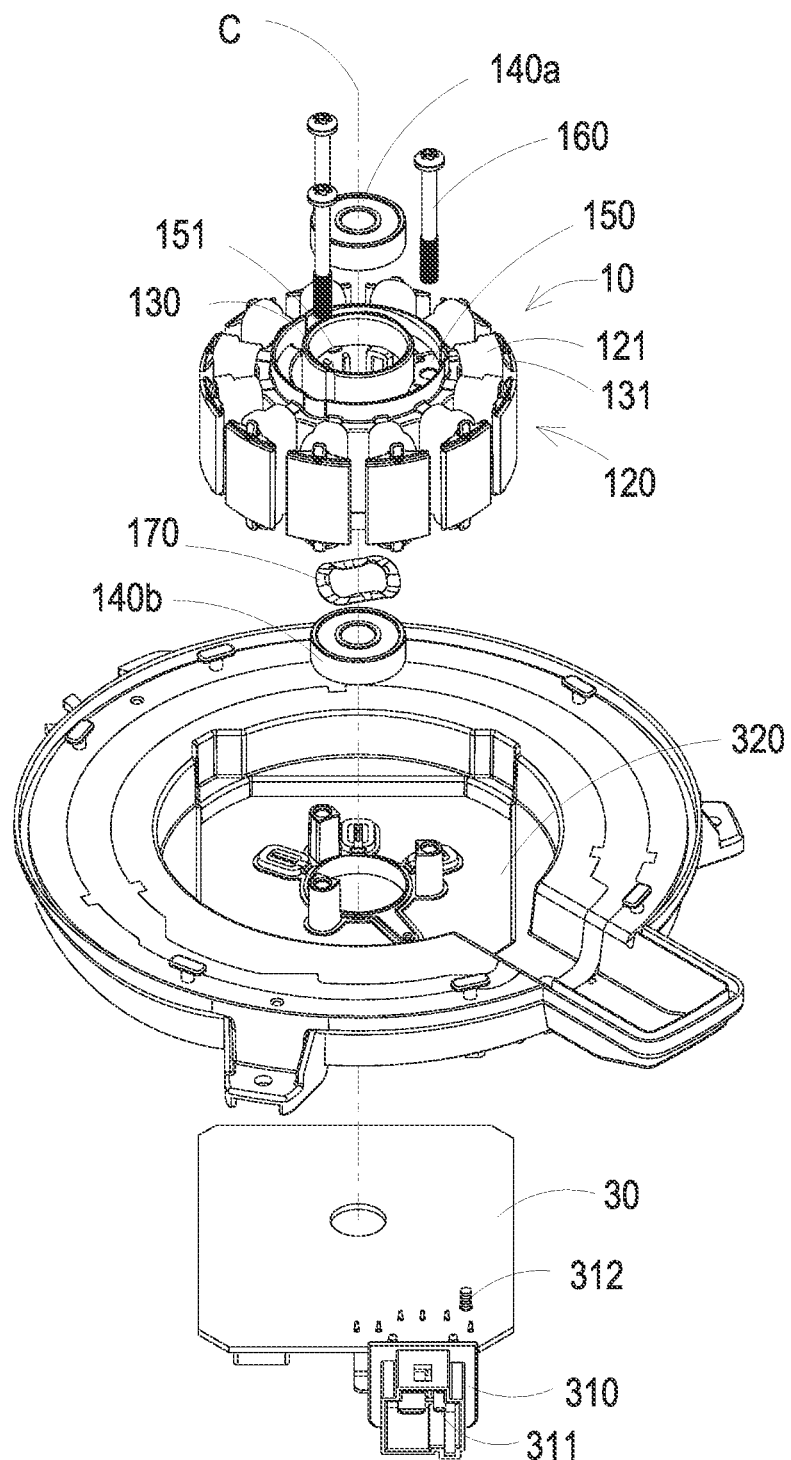
FIG. 3 is an exploded view illustrating the partial structure of the motor according to the first embodiment of the present disclosure.
Figure 4:
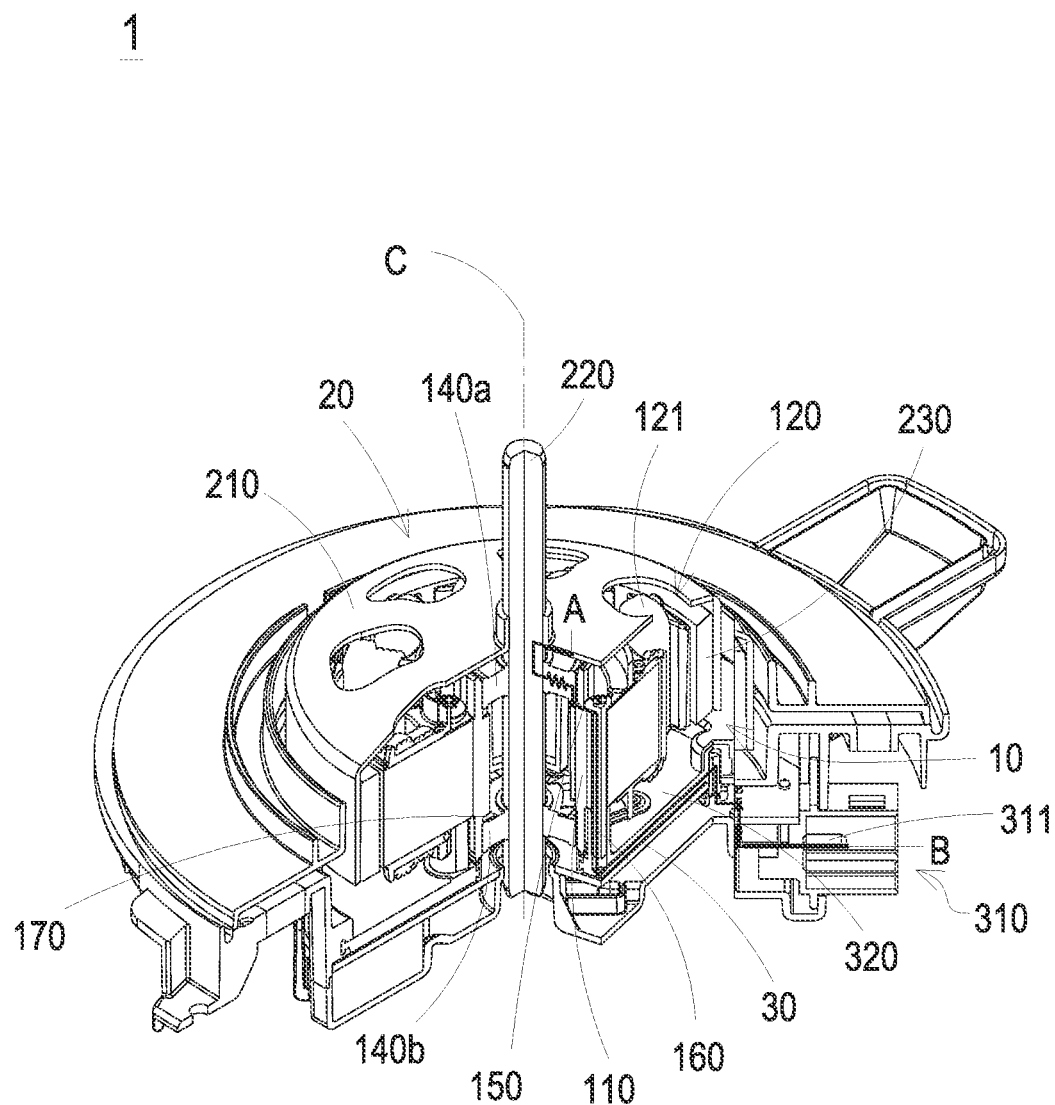
FIG. 4 is a perspective cutaway view illustrating a grounding path of the motor according to the first embodiment of the present disclosure.
Figure 5:
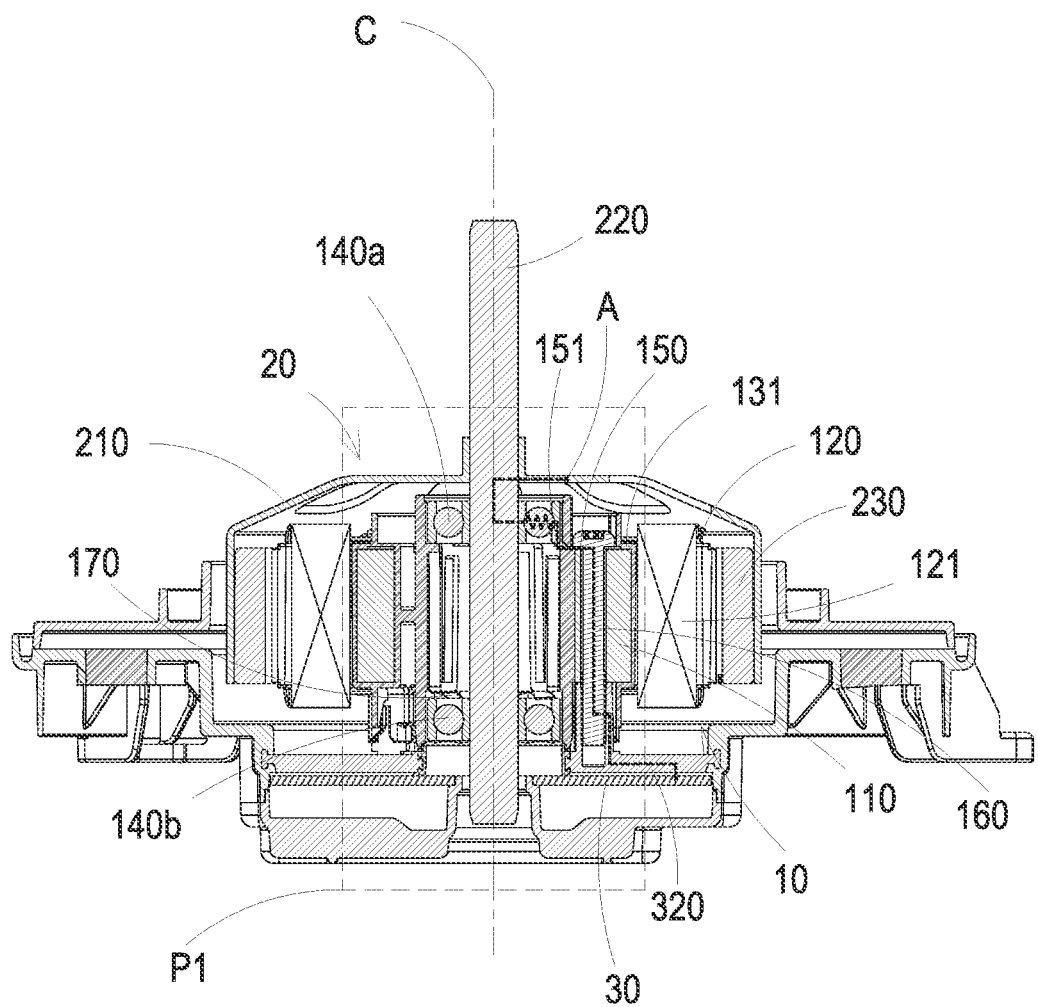
FIG. 5 is a cross-sectional structure illustrating the motor according to the first embodiment of the present disclosure.
Figure 6:
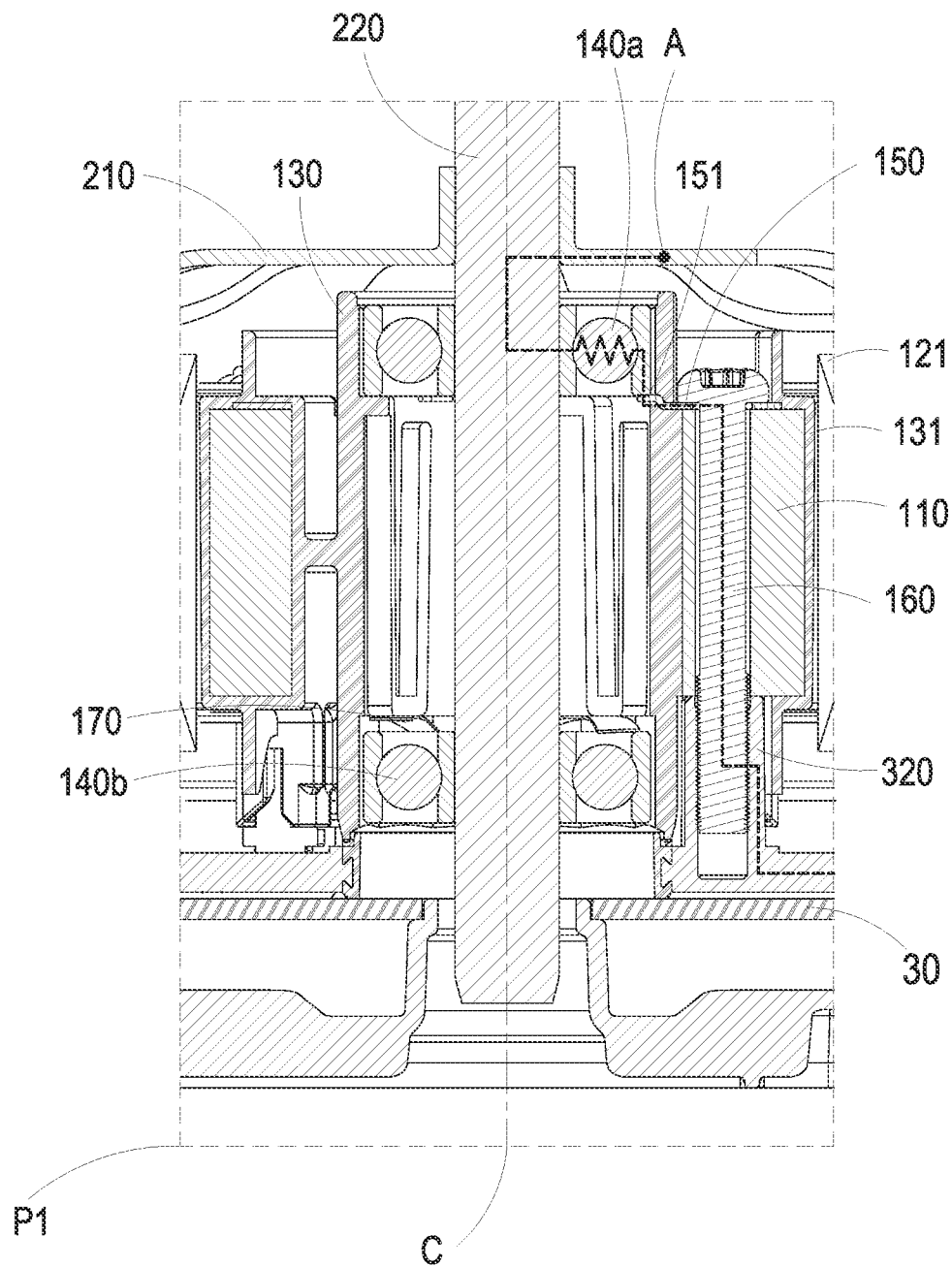
FIG. 6 is an enlarged view of area P1 in FIG. 5.

FIG. 1 is a perspective structural view illustrating a motor according to a first embodiment of the present disclosure. FIG. 2 a perspective structural view illustrating the motor having the stator and the rotor disassembled according to the first embodiment of the present disclosure. FIG. 3 is an exploded view illustrating the partial structure of the motor according to the first embodiment of the present disclosure. FIG. 4 is a perspective cutaway view illustrating a grounding path of the motor according to the first embodiment of the present disclosure. FIG. 5 is a cross-sectional structure illustrating the motor according to the first embodiment of the present disclosure. In the embodiment, the motor 1 is for example an inner-rotor-and-outer-stator type motor, and includes a stator 10 and a rotor 20. The stator 10 includes a bearing seat 130, a conductive plate 150 and an elastic element 170. The bearing seat 130 receives a first bearing 140a and a second bearing 140b. The conductive plate 150 is disposed in the bearing seat 130 and includes at least one overlapping foot 151 convexly formed thereon. In the embodiment, the elastic element 170 is disposed between the first bearing 140a and the second bearing 140b, and spatially corresponds to the at least one overlapping foot 151. Preferably but not exclusively, the elastic element 170 is integrally formed with the conductive plate 150 into one piece by an injection molding process, and electrically connected to the conductive plate 150 and the first bearing 140a. The present disclosure is not limited thereto. In the embodiment, the rotor 20 includes a rotating shaft 220, and the rotating shaft 220 is inserted in the first bearing 140a and the second bearing 140b along an axial direction C. The conductive plate 150 and the rotating shaft 220 are electrically connected to each other.

In the embodiment, the stator 10 includes a silicon steel sheet 110, and the conductive plate 150 is stacked on the silicon steel sheet 110. The stator 10 further includes a plurality of silicon steel teeth 120 arranged radially outside the silicon steel sheet 110. In the embodiment, preferably but not exclusively, the bearing seat 130 of the stator 10 is produced by an injection molding process and formed at a center of an insulation shell 131, so as to receive the silicon steel sheet 110 and the conductive plate 150. The insulation shell 131 is further extended outwardly from the bearing seat 130 in the radial direction, and covers the silicon steel sheet 110 and the plurality of silicon steel teeth 120, respectively. In the embodiment, the first bearing 140a and the second bearing 140b are received in the bearing seat 130. Preferably but not exclusively, the conductive plate 150 is clamped by the first bearing 140a and the bearing seat 130. Preferably but not exclusively, the second bearing 140b constantly abuts the bearing seat 130 along the axial direction C through the elastic element 170. With the elastic element 170 disposed between the first bearing 140a and the second bearing 140b, it ensures the accuracy of position fixing of the first bearing 140a and the second bearing 140b in the axial direction C. In the embodiment, the stator 10 further includes winding coils 121 wound on the plurality of silicon steel teeth 120. Moreover, the winding coils 121 are insulated from the silicon steel teeth 120 by the insulation shell 131.

In the embodiment, the rotor 20 includes an iron case 210. The rotating shaft 220 is disposed at the center of the iron case 210 and spatially aligned to the axial direction C. The rotor 20 further includes a plurality of magnets 230 disposed around the inner wall of the iron case 210. The iron case 210 of the rotor 20 covers the stator 10, and the rotating shaft 220 is passed through the first bearing 140a and the second bearing 140b along the axial direction C and electrically connected to the first bearing 140a. In addition, the plurality of magnets 230 are arranged around the stator 10. In the embodiment, from a starting point A of the iron case 210, an equal potential of the conductive plate 150 is achieved through the connections of the rotating shaft 220 and the first bearing 140a. When the conductive plate 150 is further connected to the grounding terminal 311, the purpose of electrical connecting the grounding terminal 311 and the rotating shaft 220 is achieved.

In the embodiment, the motor 1 further includes a circuit board 30 disposed on one end of the stator 10. Preferably but not exclusively, the circuit board 30 and the conductive plate 150 are electrically connected to each other. In the embodiment, the circuit board 30 is disposed corresponding with one end of the silicon steel sheet 110 of the stator 10 for electrically connecting with the plurality of winding coils 121 wound on each corresponding silicon steel tooth 120. The circuit board 30 further includes a connector 310 disposed thereon for power connection. Preferably but not exclusively, a grounding terminal 311 is disposed in the connector 310. When the connector 310 is connected to a power line, the grounding terminal 311 is electrically connected to the ground point B through the power line. The winding coils 121 wound on each corresponding silicon steel tooth 120 are electrically connected to the circuit board 30, so that the circuit board 30 is electrically connected to the stator 10. Thereby, the input current of the winding coils 121 is controlled by the circuit board 30.

In the embodiment, the conductive plate 150 is fixed on the bearing seat 130, and at least three overlapping feet 151 are kept to be exposed. In that, when the first bearing 140a is disposed in the bearing housing 130, the at least the three overlapping feet 151 of the conductive plate 150 are conductively contacted with the first bearing 140a, and the other part of the conductive plate 150 is electrically connected to the grounding terminal 311 on the circuit board 30. In the embodiment, the conductive plate 150 is conductively contacted with the first bearing 140a disposed on the end of the silicon steel sheet 110 opposite to the circuit board 30. In the embodiment, the stator 10 includes a conductive element 160 passing through conductive plate 150 and the silicon steel sheet 110 of the stator 10. Preferably but not exclusively, the conductive element 160 is a screw rod, which passes through the conductive plate 150 and the silicon steel sheet 110 along a direction parallel to the axial direction C.

One end of the conductive element 160 is conductively contacted with the conductive plate 150, and the conductive element 160 is electrically connected to the grounding terminal 311 on the circuit board 30. In the embodiment, preferably but not exclusively, the conductive plate 150 is partially exposed and uncovered by the bearing seat 130. The portion of the conductive element 60 passes through conductive plate 150 from the exposed part of the conductive plate 150, one end of the conductive element 60 is pressed against the conductive plate 150 to electrically connect with the conductive plate 150. In the embodiment, the circuit board 30 is further covered by a heat-dissipation cover 320. The heat dissipation cover 320 and the circuit board 30 are connected with each other through a grounding pin 312, and the grounding pin 312 is electrically connected to the grounding terminal 311 through the circuits on the circuit board 30. Preferably but not exclusively, the conductive element 160 is fastened with the heat-dissipation cover 320 and electrically connected to the grounding terminal 311 on the circuit board 30 through the heat-dissipation cover 320. In the embodiment, preferably but not exclusively, the grounding pin 312 is a screw, fastened with the heat-dissipation cover 320 and the circuit board 30. The present disclosure is not limited thereto. In the embodiment, preferably but not exclusively, the conductive element 160 passes through the stator 10, and is fastened on the heat-dissipation cover 320, so that the heat-dissipation cover 320 is fastened with the stator 10. In the embodiment, preferably but not exclusively, the heat-dissipation cover 320 is fastened with the stator 10 by three conductive elements 160. In other embodiment, the quantity of the conductive elements 160 is adjustable according to the practical requirements. The present disclosure is not limited thereto.

In the embodiment, the conductive path of grounding the stator 20 is for example started from the starting point A of the iron case 210, and passing through the rotating shaft 220 and the first bearing 140a to reach the equal potential of the conductive plate 150. Moreover, the conductive plate 150 is conducted to pass through the conductive element 160 closest to the grounding pin 312, and electrically connected to the grounding terminal 311 through the grounding pin 312 and the circuit board 30. The conductive path is adjustable according to the practical requirements, and the present disclosure is not limited thereto. In an embodiment, the conductive plate 150 is connected to the second bearing 140b, which is located at one end of the silicon steel sheet 110 corresponding to the circuit board 30, so that the conductive plate 150 is disposed adjacent to the circuit board 30 and in direct contact with the circuit board 30, instead of the conduction passing through the conductive element 160.

Figure 7A:
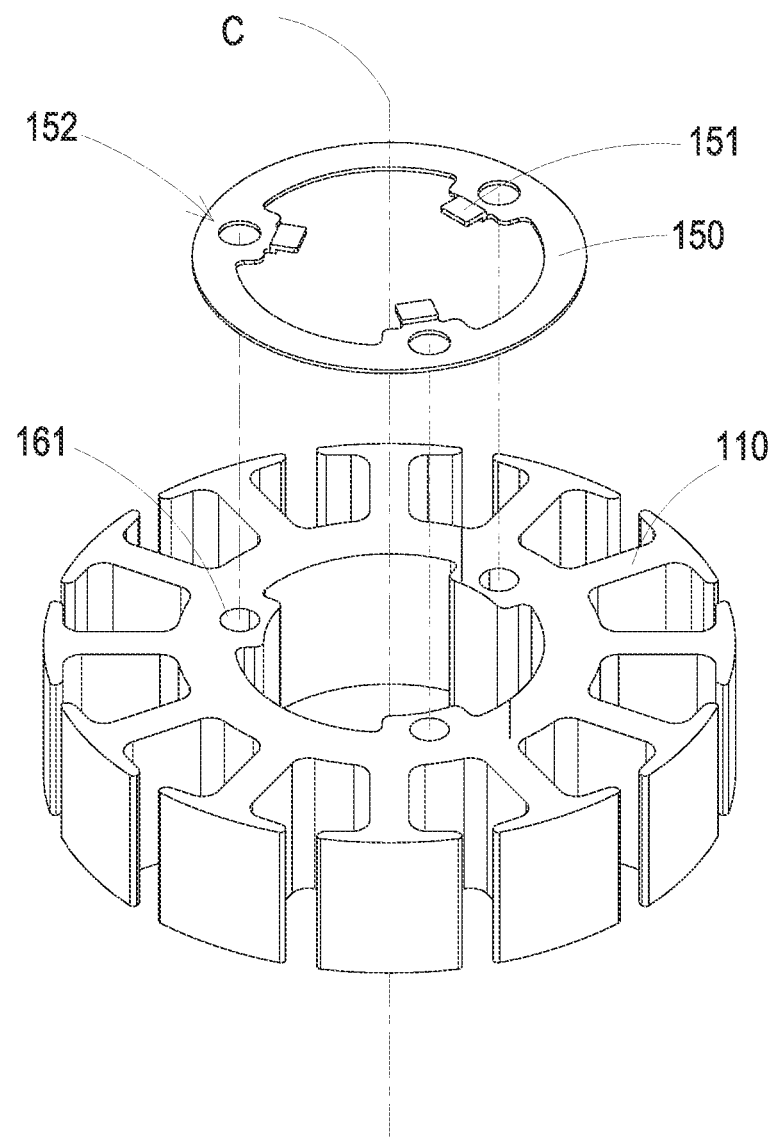
FIGS. 7A to 7C show an assembling process of parts in the stator of the motor according to the first embodiment of the present disclosure.
Figure 7B:
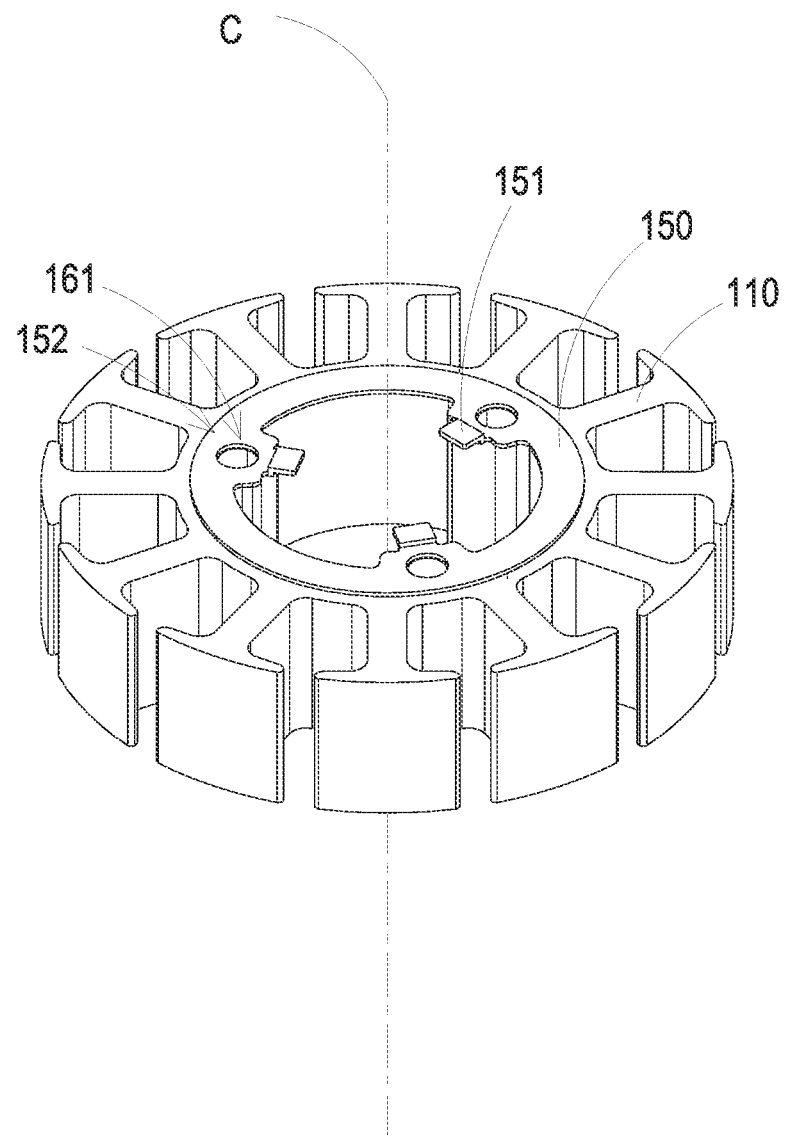
Figure 7C:
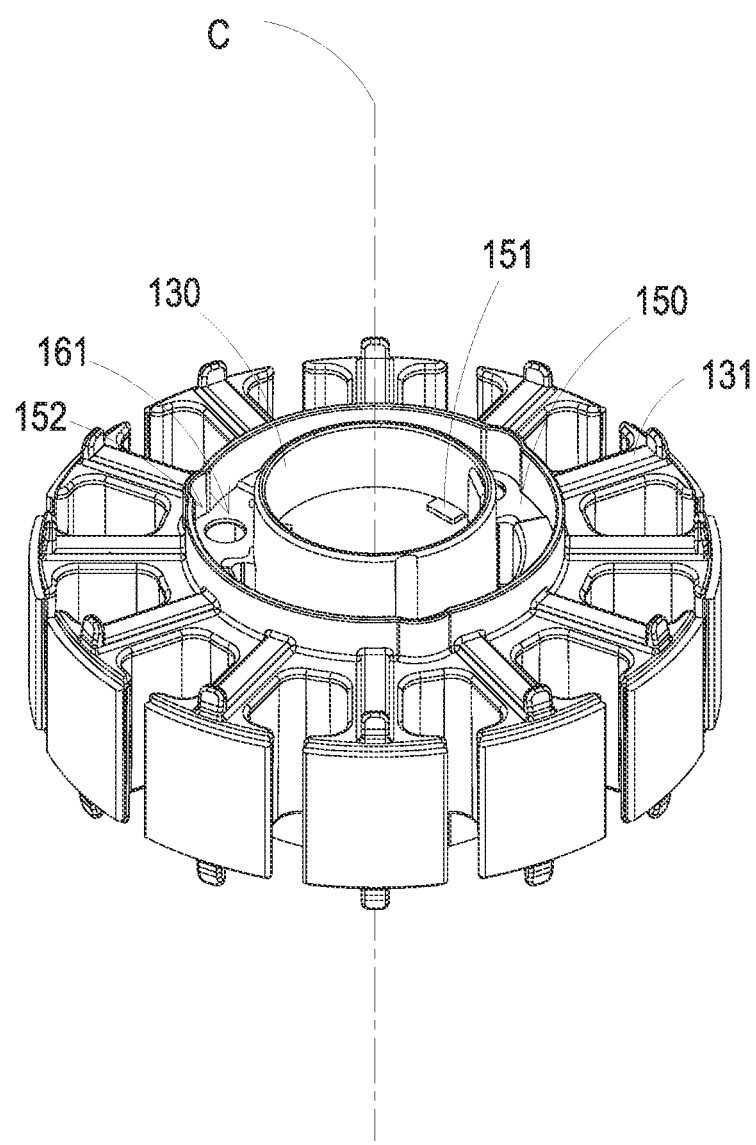

In the embodiment, the conductive plate 150, the silicon steel sheet 110, the bearing seat 130 and the insulation shell 131 of the stator 10 are integrally formed into one piece through an injection molding. FIGS. 7A to 7C show an assembling process of parts in the stator of the motor according to the first embodiment of the present disclosure. Please refer to FIGS. 1 to 6, and FIGS. 7A to 7C. In the embodiment, the conductive plate 150 includes a first positioning aperture 152, and the silicon steel sheet 110 includes a second positioning aperture 161. The first positioning aperture 152 and the second positioning aperture 161 spatially correspond to each other. When the conductive plate 150 is stacked on the end of the silicon steel sheet 110, the first positioning aperture 152 of the conductive plate 150 is aligned to the second positioning aperture 161 of the silicon steel sheet 110. Moreover, the first positioning aperture 152 and the corresponding second positioning aperture 161 are in communication with each other, as shown in FIG. 7B. Thereafter, the bearing seat 130 and the insulation shell 131 are formed through an injection molding, as shown in FIG. 7C. In the embodiment, the at least three overlapping feet 151 of the conductive plate 150, and partial periphery of the first positioning apertures 152 are kept to be exposed and uncovered after the bearing seat 130 and the insulation shell 131 are formed. Thereby, when the first bearing 140a is disposed on the bearing seat 130, the at least three overlapping feet 151 are protruded inwardly from the bearing seat 130, and it ensures that the first bearing 140a and the conductive plate 150 are in an effective electrical connection. In addition, with the conductive element 160 passing through the first positioning aperture 150 and the second positioning aperture 161 and pressing against the exposed portion of the conductive plate 150, the stator 10 and the heat-dissipation cover 320 are fastened, and the conductive plate 150 is grounded to the grounding terminal 311. In other embodiments, the conductive plate 150, the elastic element 170, the silicon steel sheet 110, the bearing seat 130 and the insulation shell 131 of the stator 10 are integrally formed into one piece through an injection molding. The present disclosure is not limited thereto.

Figure 8:
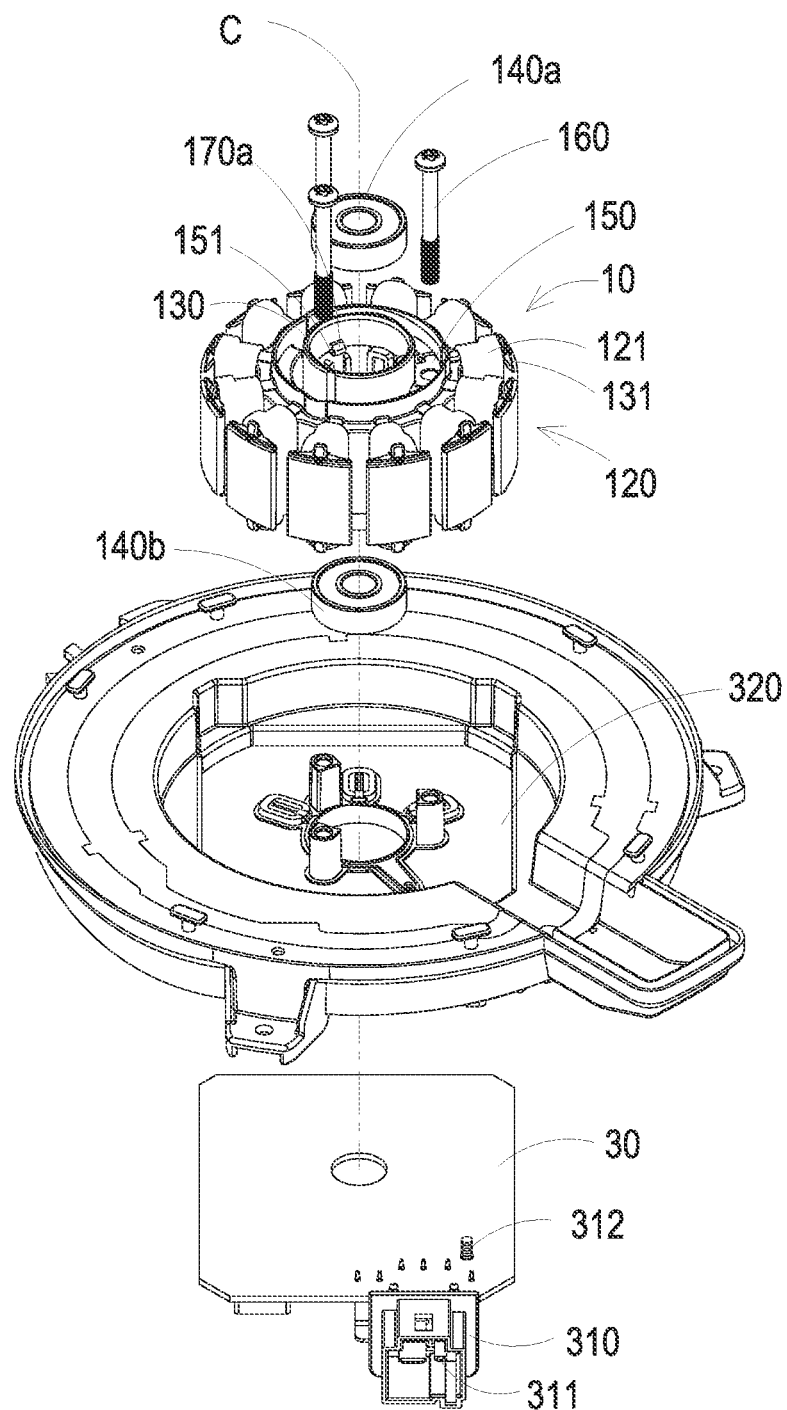
FIG. 8 is an exploded view illustrating a partial structure of a motor according to a second embodiment of the present disclosure.
Figure 9:
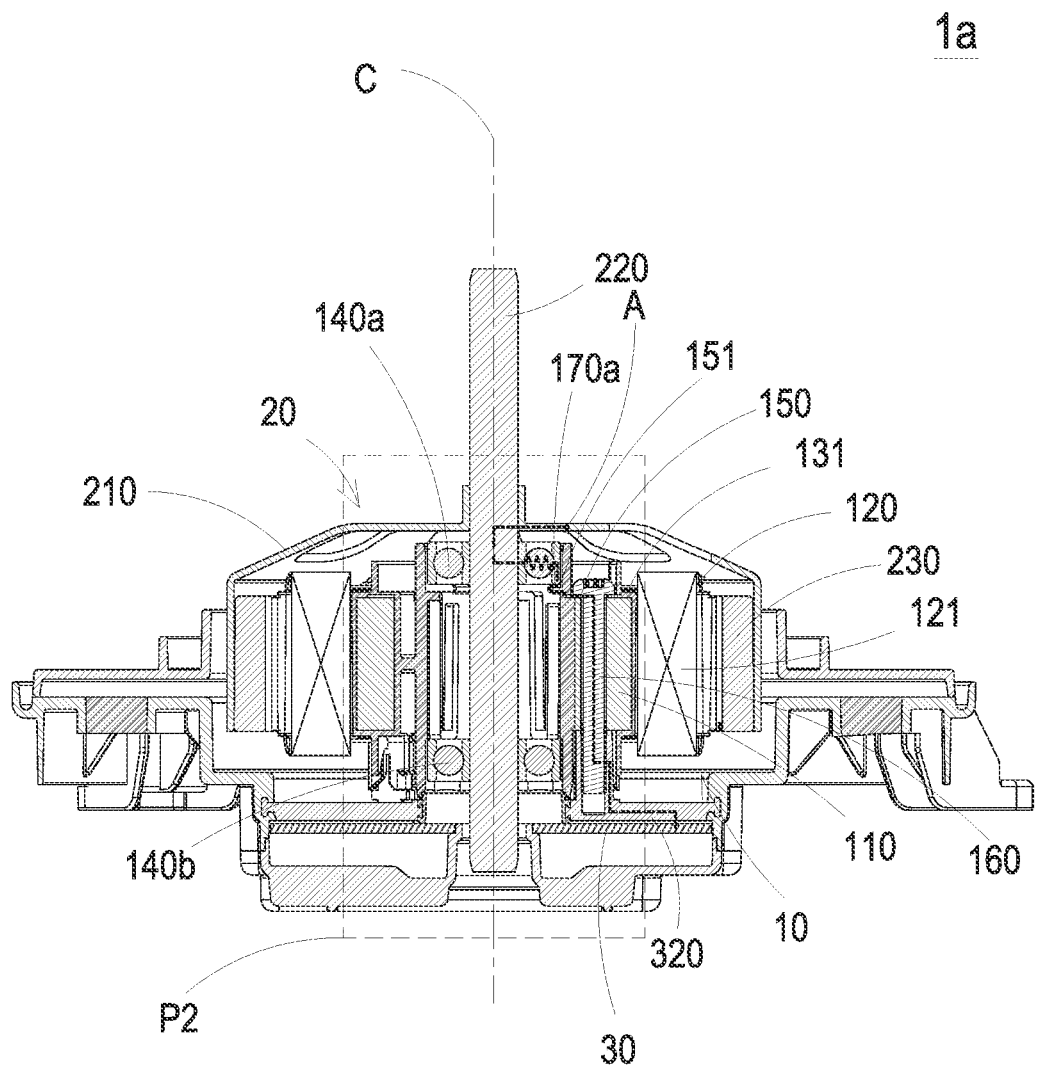
FIG. 9 is a cross-sectional structure illustrating the motor according to the second embodiment of the present disclosure.
Figure 10:
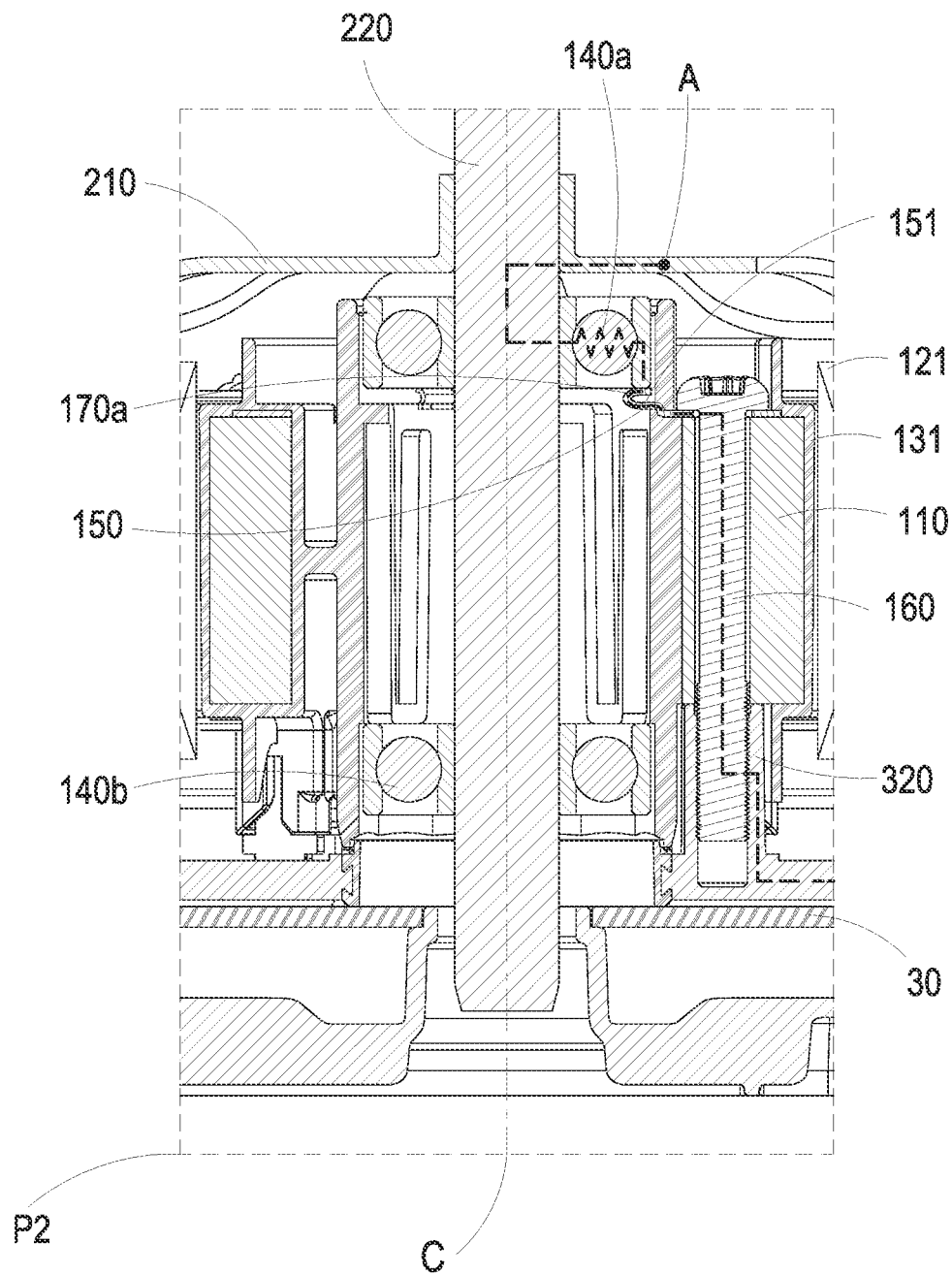
FIG. 10 is an enlarged view of area P2 in FIG. 9.

FIG. 8 is an exploded view illustrating a partial structure of a motor according to a second embodiment of the present disclosure. FIG. 9 is a cross-sectional structure illustrating the motor according to the second embodiment of the present disclosure. FIG. 10 is an enlarged view of area P2 in FIG. 9. In the embodiment, the structures, elements and functions of the motor 1a are similar to those of the motor 1 in FIGS. 1 to 6, and are not redundantly described herein. In the embodiment, the motor 1a includes a stator 10 and rotor 20. The stator 10 includes a bearing seat 130, a conductive plate 150 and an elastic element 170a. The bearing seat 130 receives a first bearing 140a and a second bearing 140b. The first bearing 140a and the second bearing 140b are arranged along an axial direction C. The conductive plate 150 is disposed in the bearing seat 130 and includes at least one overlapping foot 151 convexly formed thereon. The elastic element 170a is connected to the at least one overlapping foot 151. As to the first bearing 140a and the second bearing 140b, the first bearing 140a constantly abuts the elastic element 170a along the axial direction C, and the first bearing 140a is electrically connected to the conductive plate 150 through the elastic element 170a and the at least one overlapping foot 151. In other embodiments, the second bearing 140b corresponds to and constantly abuts the elastic element 170a. The present disclosure is not limited thereto. Notably, in the embodiment, the conductive plate 150 and the elastic element 170a are integrally formed into one piece. In the embodiment, the rotating shaft 220 of the rotor 20 is inserted in the first bearing 140a and the second bearing 140b along the axial direction C, and is electrically connected with the first bearing 140a and the second bearing 140b. With the conductive plate 150 electrically connected to the grounding terminal 311, the rotating shaft 220 and the grounding terminal 311 are in an electrical connection. Certainly, the electrical connection of the conductive plate 150 and the grounding terminal 311 or the grounding method of the conductive plate 150 is adjustable according to the practical requirements. The present disclosure is not limited thereto and not redundantly described herein.

Figure 11A:
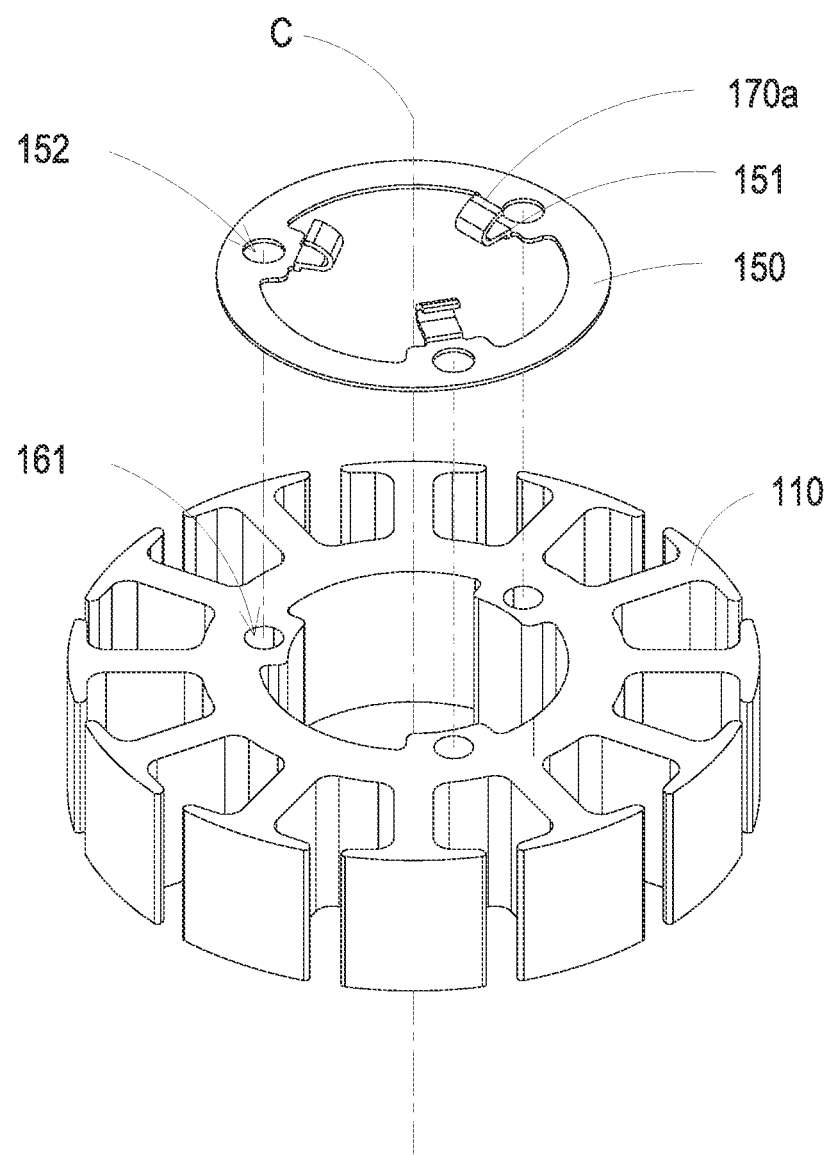
FIGS. 11A to 11C show an assembling process of parts in the stator of the motor according to the second embodiment of the present disclosure.
Figure 11B:
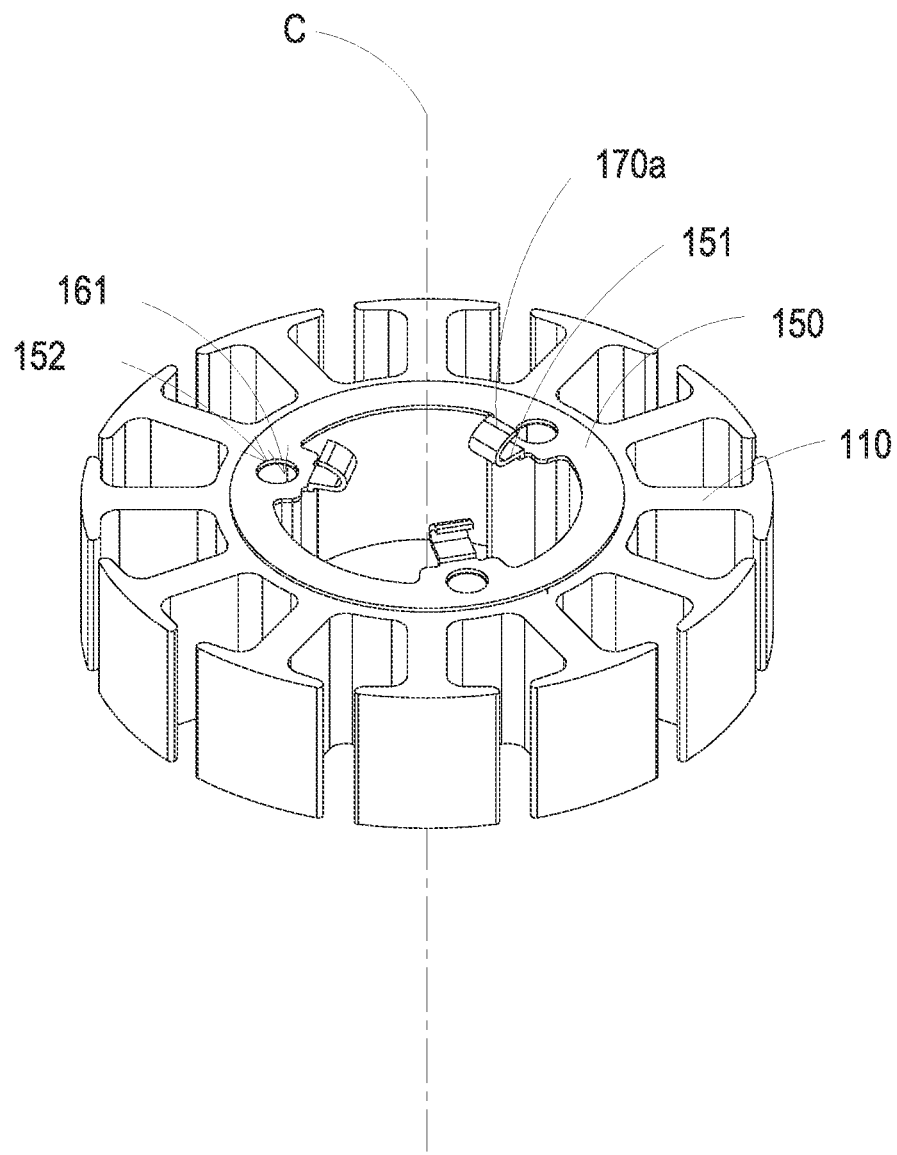
Figure 11C:
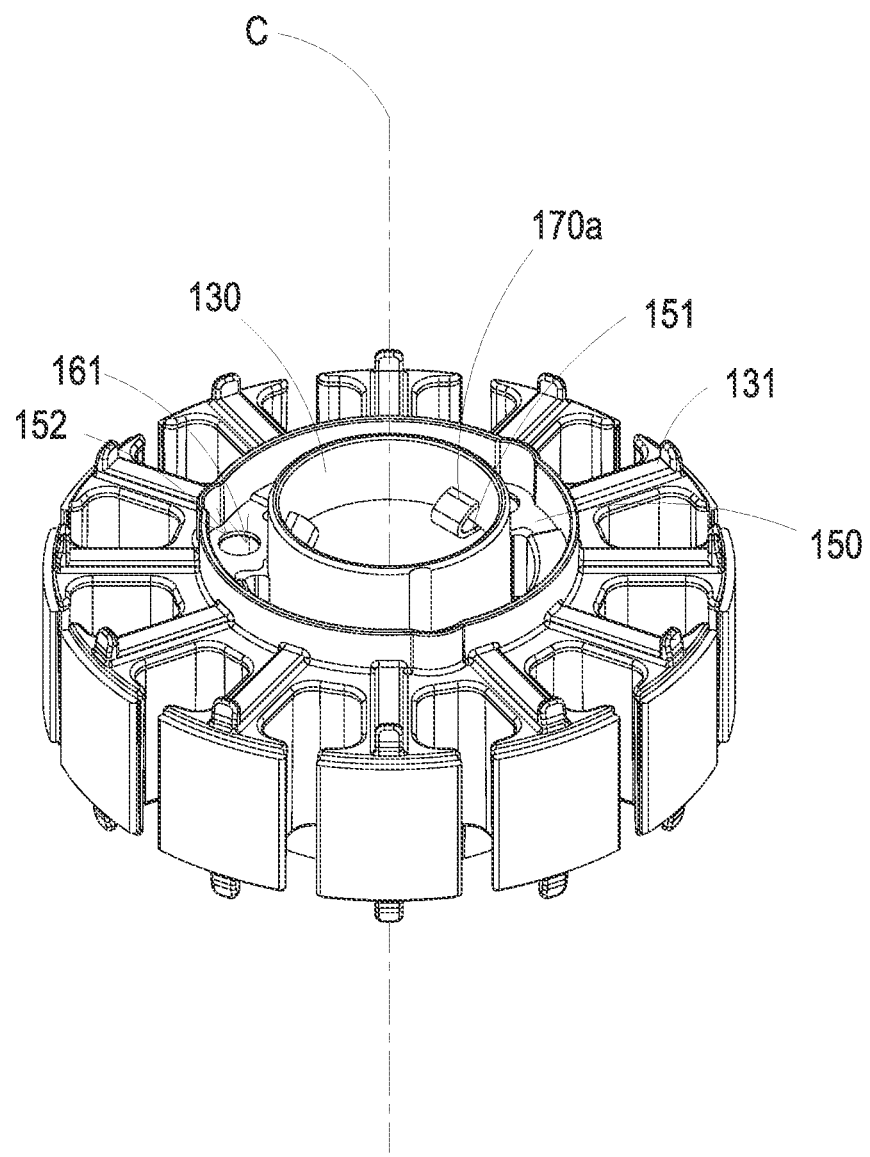

In the embodiment, preferably but not exclusively, the conductive plate 150 and the elastic element 170a are made of a metallic material and integrally formed into one piece. Moreover, the conductive plate 150, the elastic element 170a, the silicon steel sheet 110, the bearing seat 130 and the insulation shell 131 of the stator 10 are integrally formed into one piece through an injection molding. FIGS. 11A to 11C show an assembling process of parts in the stator of the motor according to the second embodiment of the present disclosure. Please refer to FIGS. 8 to 10, and FIGS. 11A to 11C. In the embodiment, the conductive plate 150 includes at least one first positioning aperture 152, and the silicon steel sheet 110 includes at least one second positioning aperture 161. The first positioning aperture 152 and the second positioning aperture 161 spatially correspond to each other. When the conductive plate 150 is stacked on the end of the silicon steel sheet 110, the first positioning aperture 152 of the conductive plate 150 is aligned to the second positioning aperture 161 of the silicon steel sheet 110. Moreover, the first positioning aperture 152 and the corresponding second positioning aperture 161 are in communication with each other, as shown in FIG. 11B. Thereafter, the bearing seat 130 and the insulation shell 131 are formed through the injection molding, as shown in FIG. 11C. In the embodiment, the elastic element 170a, the at least three overlapping feet 151 of the conductive plate 150, and partial periphery of the first positioning apertures 152 are kept to be exposed and uncovered after the bearing seat 130 and the insulation shell 131 are formed. Thereby, when the first bearing 140a is disposed on the bearing seat 130, the at least three overlapping feet 151 protruded inwardly from the bearing seat 130 and the elastic element 170a connected to the at least three overlapping feet 151 are exposed, and spatially correspond to the first bearing 140a and the second bearing 140b. It ensures that the first bearing 140a or the second bearing 140b is electrically connected to the conductive plate 150 through the elastic element 170a effectively. In addition, with the conductive element 160 passing through the first positioning aperture 150 and the second positioning aperture 161 and pressing against the exposed portion of the conductive plate 150, the stator 10 and the heat-dissipation cover 320 are fastened, and the conductive plate 150 is grounded to the grounding terminal 311 or grounded directly. Certainly, the electrical connection of the conductive plate 150 and the grounding terminal 311 or the grounding method of the conductive plate 150 is adjustable according to the practical requirements. The present disclosure is not limited thereto and not redundantly described herein.

In summary, the present disclosure provides a motor having a rotor grounded. By connecting the bearing through a conductive plate, the purpose of grounding the rotor is achieved, so as to improve the full frequency electromagnetic interference characteristics of the motor. The conductive plate and the silicon steel sheet are coated by an insulation shell through an injection molding process, and the conductive plate is partially exposed to the bearing seat and directly connected to the bearing to achieve the purpose of grounding the rotor. The entire structure is simplified, and the bearing seat and the conductive plate are integrally formed. Extra components are omitted. It is beneficial of reducing the complexity of manufacturing and the man-hours, effectively simplifying the assembly process, and reducing the cost. In addition, when the first bearing and the second bearing of the motor are disposed in the bearing seat and arranged along the axial direction, an elastic element is disposed between the first bearing and the second bearing to ensure the accuracy of position fixing in the axial direction. Since the elastic element is arranged between the first bearing and the second bearing, the elastic element can be selectively abutted by the first bearing or the second bearing.

On the other hand, with the conductive plate and the elastic element integrally formed into one piece, when the first bearing constantly abuts the elastic element, the purpose of grounding the rotor is achieved, and it ensures the accuracy of position fixing in the axial direction at the same time. On the other hand, the conductive plate and the elastic element integrally formed are coated with the silicon steel sheet by an insulation shell for example through an injection molding, so that the conductive plate, the elastic element, the silicon steel sheet, the insulation shell and an bearing seat are aligned and positioned with the bearing seat. Thus, the manufacturing process is simplified and the production cost is reduced.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A motor comprising:
    a stator comprising:
        a bearing seat receiving a first bearing and a second bearing;
        a conductive plate disposed in the bearing seat and comprising at least one overlapping foot convexly formed thereon; and
        an elastic element disposed between the first bearing and the second bearing, wherein the elastic element is electrically connected to the conductive plate and the first bearing; and
    a rotor comprising a rotating shaft inserted in the first bearing and the second bearing along an axial direction, wherein the conductive plate and the rotating shaft are electrically connected to each other.

2. The motor according to claim 1, wherein the stator comprises a silicon steel sheet, and the conductive plate is stacked on the silicon steel sheet.

3. The motor according to claim 2, wherein the conductive plate comprises a first positioning aperture, and the silicon steel sheet comprises a second positioning aperture, wherein the first positioning aperture and the second positioning aperture are in communication with each other; and the stator comprises at least one conductive element passing through the first positioning aperture and the second positioning aperture.

4. The motor according to claim 2, wherein the stator comprises an insulation shell receiving the silicon steel sheet and the conductive plate.

5. The motor according to claim 1, wherein the elastic element is integrally formed with the at least one overlapping foot into one piece.

6. The motor according to claim 1, further comprising a circuit board, wherein the circuit board and the conductive plate are electrically connected to each other.

7. The motor according to claim 1, further comprising a grounding terminal, wherein the grounding terminal and the rotating shaft are electrically connected to each other.

8. A motor comprising:
    a stator comprising:
        a first bearing;
        a conductive plate comprising an elastic element, wherein the first bearing is electrically connected to the conductive plate through the elastic element; and
        a bearing seat receiving the first bearing and the conductive plate; and
    a rotor comprising a rotating shaft, wherein the rotating shaft is passed through the first bearing along an axial direction, and the rotating shaft is electrically connected to the conductive plate.

9. The motor according to claim 8, wherein the stator comprises a silicon steel sheet, and the conductive plate is stacked on the silicon steel sheet.

10. The motor according to claim 9, wherein the conductive plate comprises a first positioning aperture, and the silicon steel sheet comprises a second positioning aperture, wherein the first positioning aperture and the second positioning aperture are in communication with each other; and the stator comprises at least one conductive element passing through the first positioning aperture and the second positioning aperture.

11. The motor according to claim 9, wherein the stator comprises an insulation shell receiving the silicon steel sheet and the conductive plate.

12. The motor according to claim 11, wherein the bearing seat and the insulation shell are formed by an injection molding process.

13. The motor according to claim 8, wherein the conductive plate is integrally formed with the elastic element.

14. The motor according to claim 8, further comprising a circuit board, wherein the circuit board and the conductive plate are electrically connected to each other.

15. The motor according to claim 8, further comprising a grounding terminal, wherein the grounding terminal and the rotating shaft are electrically connected to each other.

16. A motor comprising:
    a stator comprising:
        a first bearing;
        a conductive plate comprising an elastic element, wherein the first bearing is electrically connected to the conductive plate through the elastic element; and
        a bearing seat, wherein the conductive plate is clamped by the first bearing and the bearing seat; and
    a rotor comprising a rotating shaft, wherein the rotating shaft is passed through the first bearing along an axial direction, and the rotating shaft is electrically connected to the conductive plate.

17. The motor according to claim 16, wherein the stator comprises a silicon steel sheet, and the conductive plate is stacked on the silicon steel sheet.

18. The motor according to claim 17, wherein the stator comprises at least one conductive element, the conductive plate comprises a first positioning aperture, and the silicon steel sheet comprises a second positioning aperture, wherein the at least one conductive element passes through the first positioning aperture and the second positioning aperture.

19. The motor according to claim 16, further comprising a circuit board, wherein the circuit board and the conductive plate are electrically connected to each other.

20. The motor according to claim 16, further comprising a grounding terminal, wherein the grounding terminal and the rotating shaft are electrically connected to each other.

* * * * *